United States Patent [19]
Blonder

[11] Patent Number: 5,245,454
[45] Date of Patent: Sep. 14, 1993

[54] LCD DISPLAY WITH MICROTEXTURED BACK REFLECTOR AND METHOD FOR MAKING SAME

[75] Inventor: Greg E. Blonder, Summit, N.J.

[73] Assignee: AT&T Bell Laboratories, Murray Hill, N.J.

[21] Appl. No.: 816,405

[22] Filed: Dec. 31, 1991

[51] Int. Cl.⁵ .................................................. G02B 5/08
[52] U.S. Cl. ..................................... 359/70; 359/530; 359/546; 359/850
[58] Field of Search ................ 359/70, 530, 546, 850, 359/851, 627

[56] References Cited

U.S. PATENT DOCUMENTS

| | | | |
|---|---|---|---|
| 2,951,419 | 9/1960 | Lemelson | 359/546 |
| 3,253,971 | 5/1966 | Garling | 359/546 |
| 4,106,859 | 8/1978 | Doriguzzi et al. | |
| 4,185,895 | 1/1980 | Stephens et al. | |
| 4,249,801 | 2/1981 | Masubuchi | |
| 4,431,272 | 2/1984 | Yazawa et al. | |
| 4,706,173 | 11/1987 | Hamada et al. | |
| 4,712,867 | 12/1987 | Malek | 359/530 |
| 4,991,940 | 2/1991 | Dalisa et al. | |
| 5,128,787 | 7/1992 | Blonder | 359/851 |

*Primary Examiner*—Bruce Y. Arnold
*Assistant Examiner*—J. P. Ryan
*Attorney, Agent, or Firm*—Glen E. Books

[57] ABSTRACT

Applicant has discovered a method for microembossing reflector surfaces with controlled reflecting patterns too small to be resolved by the unaided eye but capable of providing controlled reflection characteristics superior to uncontrolled random deformation. The result is a microtextured reflector of having dispersion characteristics of enhanced uniformity and a display device which can be read over an enhanced range of viewing angles. Specifically, a reflector in accordance with the invention comprises a base plane and a pattern of microelements having maximum lateral dimensions less than 125 micrometers and smooth, continuous mold-formed surfaces arising from the base plane. Such a reflector surface can be made using a master formed by covering a substrate with photoresist, exposing the resist to define a pattern of microelements having maximum lateral dimensions less than about 125 micrometers and heating the substrate to partially melt the resist elements thereby obtaining smooth-surfaced microelements. The master can be used to form an embossing surface or mold, which, in turn, can be used to make a microtextured reflecting surfaces. A preferred reflecting surface is composed of closely packed, smooth-surfaced spherical segments having diameters of twenty-five microns, altitudes of four microns. Advantageously random segments are disposed between successive spherical segments. The preferred reflector possesses reflecting characteristics superior to conventional isotropic reflectors.

11 Claims, 2 Drawing Sheets

LCD DISPLAY WITH MICROTEXTURED BACK REFLECTOR AND METHOD FOR MAKING SAME

TECHNICAL FIELD

This invention relates generally to transparent display devices, and, more particularly, to a transparent display device, such as a liquid crystal display, having a microtextured back reflector to permit viewing over a predeterminable range of angles with substantially uniform intensity of back reflection. By transparent display, applicant refers to visual display devices wherein either the visual message portion of the display or the background portion is transparent or translucent. By microtextured reflector, applicant refers to reflecting surfaces comprised of a pattern of microelements having smooth, continuous surfaces and maximum lateral dimensions of less than about 125 micrometers. Because the lateral geometry and altitude of the elements are controlled rather than random, a surface of controlled reflecting characteristics can be formed.

BACKGROUND OF THE INVENTION

The combination of microelectronic circuits and low power liquid crystal displays has led to a wide variety of portable electronic products. These products range from electronic watches to hand-held television receivers and lap top computers. Low power consumption is a critical requirement for each of them.

Despite their considerable utility in conjunction with integrated circuits, LCD displays have a number of shortcomings. In typical LCD cells the activated portion is darkened, representing a visual message, and the unactivated portion is transparent, constituting visual background. One shortcoming of LCD displays is the relatively low contrast between the activated portion and the unactivated portion. The contrast can be increased by backlighting the cell, thereby producing a sharp visual contrast between the portions of the cell darkened by activation and the light shining through the transparent regions. Unfortunately, backlighting requires power. Even in so complex an electronic structure as a portable computer, the power used in display backlighting is the major drain on the system batteries.

An alternative approach to increasing contrast is to provide a reflector on the back of the cell to enhance contrast by reflecting light through the transparent regions. As in the case of the backlighted cell, the reflected light enhances the visual contrast. This approach also has shortcomings. One difficulty is that both the cell and the reflector typically have parallel planar surfaces. As a consequence, light reflected from the back reflector and glare reflected from the front surface of the cell are reflected in the same direction. Moreover, the greater the amount of light that is reflected from the back reflector, the greater the amount of glare reflected from the front surface. A second difficulty is that the cell is usually thicker than a single pixel of the display. As a consequence, a shadow of darkened pixel cast onto the reflector can be confused with the real image.

Applicant's co-pending application, Ser. No. 07/623476 filed Dec. 7, 1990 and entitled "LCD Display with Multifaceted Back Reflector" discloses a reflector structure designed to concentrate reflected light and simulate the visual effect of backlighting without expenditure of backlighting power. This approach is particularly useful, in applications such as computers, where the likely viewing direction is constrained by the nature of the equipment with which the display is used, e.g. the display is likely to be vertical or horizontal.

In other applications, such as portable telephones or watches in light rich environments, the viewing direction is not constrained, and the back reflector is advantageously an isotropic reflector. Unfortunately conventional isotropic reflectors are not truly isotropic. Because geometric features of the reflector must be smaller than the eye can distinguish, isotropic reflectors are typically made by random deformation processes such as sandblasting or chemical pitting. The resulting reflection pattern exhibits a cosine dependence at angles away from the glare angle due to random deformation, but nonetheless remains peaked at the glare angle due to specular reflection from non-deformed portions of the surface.

SUMMARY OF THE INVENTION

Applicant has discovered a method for microembossing reflector surfaces with controlled reflecting patterns too small to be resolved by the unaided eye but capable of providing controlled reflection characteristics superior to uncontrolled random deformation. The result is a microtextured reflector of having dispersion characteristics of enhanced uniformity and a display device which can be read over an enhanced range of viewing angles. Specifically, a reflector in accordance with the invention comprises a base plane and a pattern of microelements having maximum lateral dimensions less than 125 micrometers and smooth, continuous mold-formed surfaces arising from the base plane. Such a reflector surface can be made using a master formed by covering a substrate with photoresist, exposing the resist to define a pattern of microelements having maximum lateral dimensions less than about 125 micrometers and heating the substrate to partially melt the resist elements thereby obtaining smooth-surfaces microelements. The master can be used to form an embossing surface or mold, which, in turn, can be used to make a microtextured reflecting surfaces. A preferred reflecting surface is composed of closely packed, smooth-surfaced spherical segments having diameters of twenty-five microns, altitudes of four microns. Advantageously random segments are disposed between successive spherical segments. The preferred reflector possesses reflecting characteristics superior to conventional isotropic reflectors.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
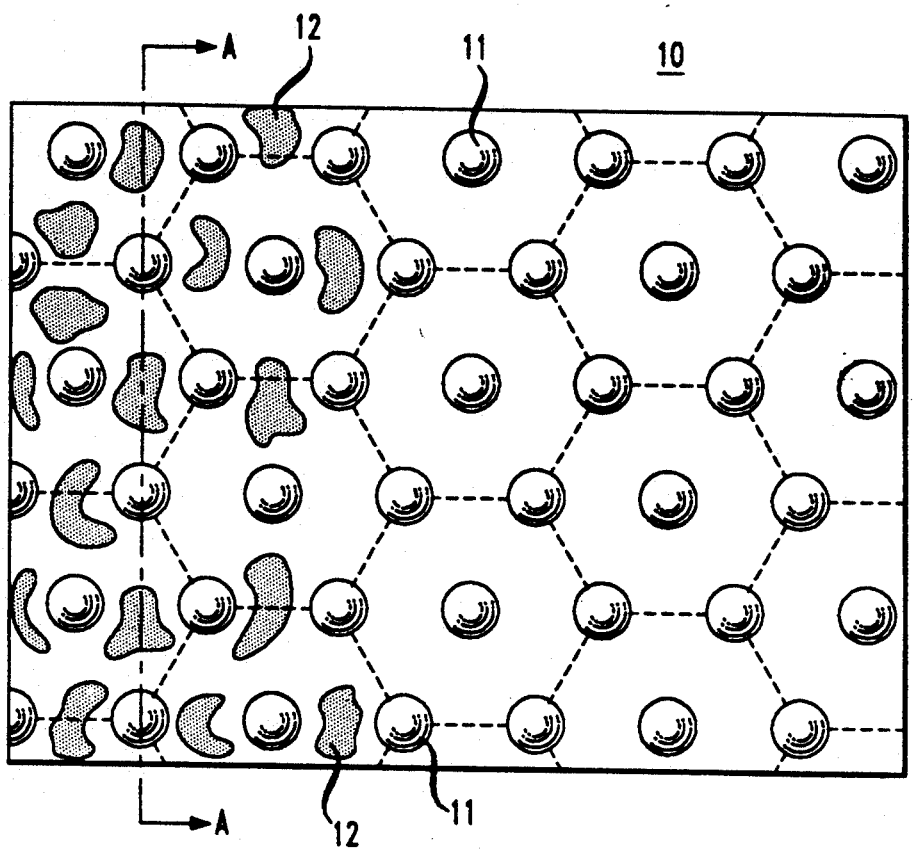
FIG. 1 is a top view of a preferred reflector in accordance with the invention.
Figure 2:
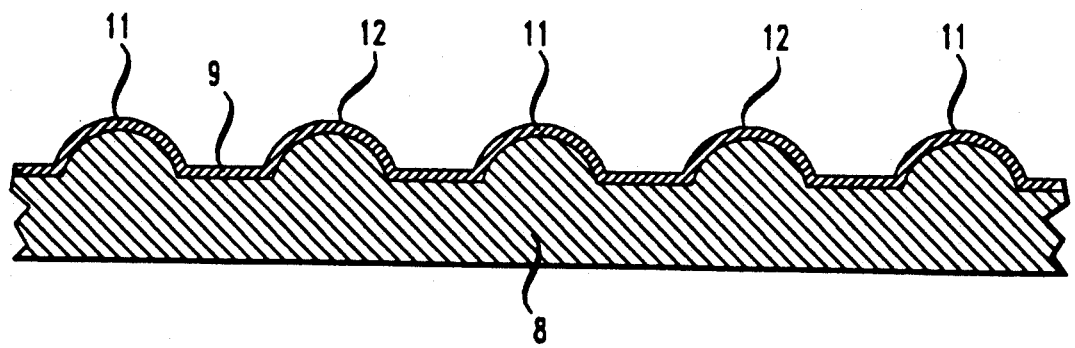
FIG. 2 is a schematic cross section of the reflector of FIG. 1.

Referring to the drawings, FIGS. 1 and 2 are schematic enlarged top and cross sectional views respectively of a preferred reflecting surface in accordance with the invention. Specifically, FIG. 1 shows a greatly enlarged top view of a microtextured reflector 10 comprising a pattern of microelements, each having smooth, continuous, mold-formed surfaces and maximum lateral dimensions along the plane of the surface of less than about 125 micrometers. Here the preferred pattern comprises a mixture of two microelements: spherical segments 11 and random segments 12. The bases of the spherical segments, as seen from a top view occupy 50 to 90% of the reflector surface and preferably 50 to 80%. As seen from the top the spherical segments occupy on the reflector plane, base circles of diameter in the range 10–125 microns, and preferably they all occupy bases of diameter $25 \pm 10$ micrometers. Preferably the altitudes of the spherical segments (the perpendicular distances from the surfaces to the base planes) are within the range 10–20% of the diameters. The spherical segments can be randomly distributed but are preferably distributed in approximately an open hexagonal array.

The random segments 12 are microelements having irregularly shaped bases disposed between successive spherical microelements. The random segments preferably have no dimension exceeding 125 micrometers and lateral base dimensions comparable to the base diameters of the spherical segments.

The rationale for the preferred surface is as follows. If the surface consisted of a close-packed hexagonal array of spherical segments, then $\pi/2\sqrt{3} \approx 90\%$ of the base plane would be covered by the bases of the spherical segments. However the uniformity of the array could, under some lighting conditions, produce undesirable reflected "rainbow" effects due to diffraction. Moreover if the periodicity of the array were to match the periodicity of the pixels in an overlying LCD display, undesirable moire patterns could occur. However both of these problems can be avoided by randomizing the position of the reflecting segments.

Preferred, however, is to space the spherical segments apart by about their base diameters and to fill the interstices between them with elements of randomly shaped bases having lateral dimensions comparable to the base diameters of the spherical segments. Since the radii of curvature of these random elements are approximately the same as those of the spherical elements, their reflectance as a function of angle will be nearly the same.

As shown in FIG. 2, which is a schematic cross section of the FIG. 1 reflector along the line AA', the spherical segments 11 and random segments 12 are advantageously molded or embossed into a plastic substrate 8, such as polymethyl methacrylate (PMM) coated with a reflecting material 9 such as aluminum. As can be seen from FIG. 2, while the bases of the random segments are irregular, the surfaces 12 extending up from the bases are preferably smooth and continuous.

Figure 3:
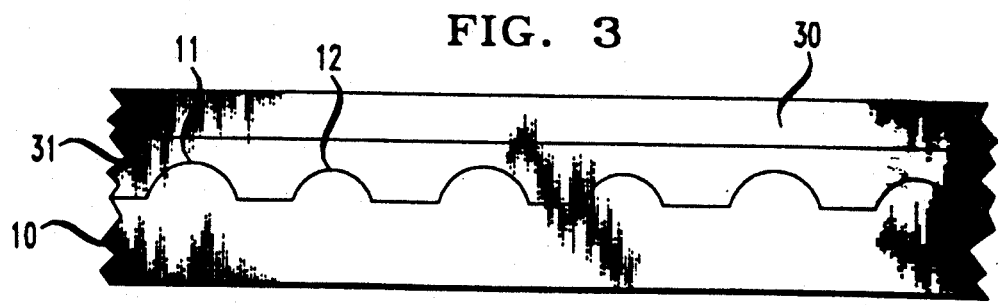
FIG. 3 is a schematic cross section of a transparent display having a back reflector of the type shown in FIGS. 1 and 2.

FIG. 3 is a schematic cross section of a transparent display using a microtextured back reflector of the type shown in FIGS. 1 and 2. Specifically, the display comprises a transparent dispay cell 30, such as an LCD cell, having a microtextured back reflector 10. Reflector 10 is bonded to cell 30 by transparent cement 31 such as transparent silicone rubber cement 31. This display is particularly useful as a display screen for a portable telephone where the angle of view is not fixed.

Figure 4:
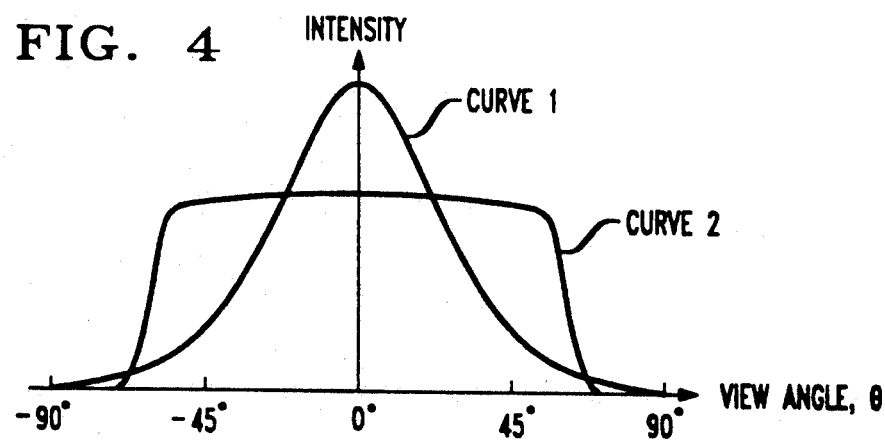
FIG. 4 is a graphical illustration showing the reflected intensity versus viewing angle of the reflector of FIGS. 1 and 2.

The advantages of the FIG. 3 visual display can be understood by reference to FIG. 4 which is a schematic graphical plot of reflected light intensity of the back reflector 10 versus angle of illumination $\theta$. Viewing at normal incidence is presumed. Curve 1 shows the intensity distribution for a conventional isotropic reflector, and Curve 2 shows the intensity distribution for a back reflector of the type shown in FIGS. 1 and 2.

As illustrated the peak reflected intensity for the conventional matte finished reflector is in the normal direction with $\theta = 0°$. This is precisely the angle of maximum glare from a visual display using the reflector. Thus much of the light reflected by the conventional reflector is reflected at an angle a viewer is not likely to use and therefore wasted.

In contrast, the back reflector of FIGS. 1 and 2 has a distribution which is relatively flat out to angles of 45° or more, at which angle intensity falls off very rapidly. Thus the reflector of FIGS. 1 and 2 when used in the display of FIG. 3 provides greater uniformity over a wider range of viewing angles. More specifically, the range of efficient reflection for the reflector of FIGS. 1 and 2 can be controlled by controlling the ratio of the altitude h of the spherical segments to their base plane diameter d. The greater h/d, the greater the radius of curvature and the larger the maximum reflected angle $\theta$. Specifically, $h/d = \frac{1}{2} \tan \theta/4$.

Figure 5:
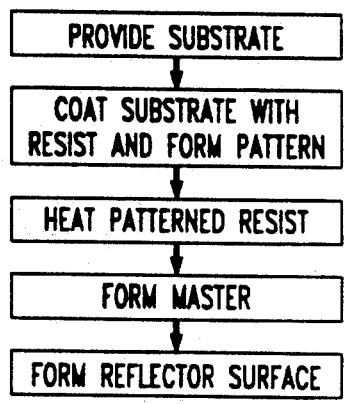
FIG. 5 is a flow diagram showing the steps involved in making a microtextured back reflector in accordance with the invention.
Figure 6:
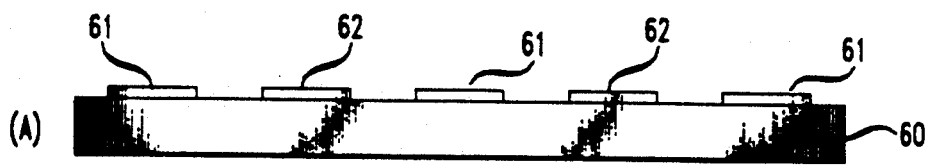
FIGS. 6A and 6B are illustrate schematic cross sections of the structures made at various steps in the process of FIG. 5.

FIG. 5 is a block diagram showing the steps used in making a microtextured reflecting element of the type shown in FIGS. 1 and 2. FIG. 6 shows the structures produced at various stages of the FIG. 5 process.

The first step shown in FIG. 5 is to provide a substrate such as a silicon wafer (60 of FIG. 6).

The next step is to form on the substrate a planar pattern of photoresist corresponding to the bases of the spherical and random segments to be formed. This can be accomplished using conventional photolithographic processing. FIG. 6A shows the substrate 60 supporting adherent planar regions of photoresist 61 and 62 corresponding to the bases of spherical and random segments. Preferably the segments have a maximum lateral dimension of less than 125 micrometers. The photoresist can be AZ 1300 or AZ 1400 commercially marketed by Shipley Photoresist Co.

The third step shown in FIG. 5 is to heat the resist to form smooth continuous segments. For example heating developed AZ 1300 spots to 110° C. for a period of about 4 minutes produces smooth continuous profiles as shown in FIG. 6B. The radius of curvature of the spherical segments formed by this process is uniquely determined by the thickness of the resist and the diameter of the base.

As shown in FIG. 5, the fourth step is to form an embossing surface or mold conforming to the thus-formed surface. This can be accomplished, for example, by electroplating a few mils of nickel onto the surface of FIG. 6B. The resulting textured nickel foil can, in turn, be laminated to a copper plate or roll. The final step shown in FIG. 5 is to use the textured surface to texture of plastic material or metal foil. Plastic, in turn, can be provided with a reflecting surface of aluminum by vacuum evaporation, and the back reflector is complete.

Figure 7:
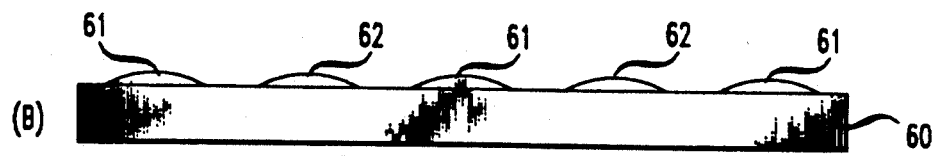
FIG. 7 is an alternative embodiment of a reflector.
Figure 8:
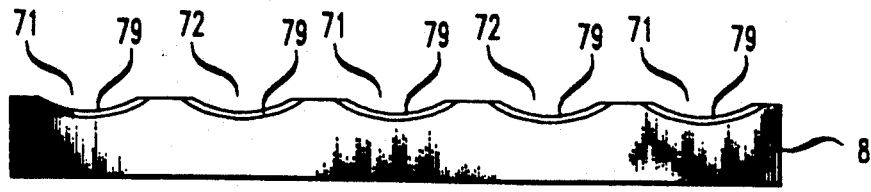

FIG. 7 illustrates that microtextured reflective elements in accordance with the invention can be recessed into the body of the reflecting layer rather than projecting out from the body. Specifically, FIG. 7 is a cross section of a reflector wherein the reflective elements are inverted as compared with FIG. 2. Inverted spherical segments 71 and random segments 72 arrayed and dimensioned as described in connection with FIGS. 1 and 2 are molded or embossed into plastic substrate 8. In this particular embodiment the plastic is a transparent plastic and reflecting material 79 is selectively applied to the inverted reflective elements to form a transflective device capable of transmitting backlighting in light poor environments and reflecting light in light rich environments. Specifically, the uncoated transparent plastic regions transmit backlighting (not shown) and the reflecting elements 71 and 72 reflect ambient light. Such a transflective device is useful as a back reflector in the display of FIG. 3.

The reflecting material 79 can be selectively applied to the inverted elements by an electroplating process using a sensitizer. After the surface is formed on the plastic, the sensitizer is applied and the surface is subjected to buffing to selectively remove the sensitizer from the non-recessed regions. Electroplating will then selectively deposit reflecting material in the recessed regions where the sensitizer remains.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

I claim:

1. A transparent display device comprising:
 a transparent display cell having front and back sides,
 a back reflector disposed adjacent the back side of said cell, said back reflector having a microtextured reflecting surface comprising a base plane and a pattern of spherical segment reflecting surfaces having maximum lateral dimensions less than 125 micrometers and smooth, continuous mold-formed surfaces rising from said base plane.

2. The display device of claim 1 wherein said pattern of microelements comprises a plurality of spherical segment reflecting surfaces having bases in the range 10-125 micrometers in diameter.

3. The display device of claim 2 further comprising segments of irregular base having smooth, continuous reflecting surfaces disposed between successive spherical segments.

4. The display device of claim 2, wherein the altitudes of said spherical segments are 10 to 20% of their diameters.

5. The display device of claim 2, wherein the combined areas of the spherical bases comprise 50 to 90% of the area of said reflector.

6. The display device of claim 2, wherein said spherical segments are disposed in a hexagonal array.

7. A microtextured reflecting layer comprising:
 a layer of material having a surface comprising a plurality of reflecting spherical segments having smooth, continuous mold-formed surfaces and bases in the range 10-125 micrometers in diameter.

8. The reflecting layer of claim 7 further comprising segments of irregular base having smooth, continuous surfaces disposed between successive spherical segments.

9. The reflecting layer of claim 7, wherein the altitudes of said spherical segments are 10% to 20% of the diameters.

10. The reflecting layer of claim 7, wherein the combined areas of the spherical segment bases comprise 50 to 90% of the area of said reflecting element.

11. The reflecting layer of claim 7, wherein said material is transparent.

* * * * *

Disclaimer 5,245,454—Greg E. Blonder, Summit, N.J. LCD DISPLAY WITH MICROTEXTURED BACK REFLECTOR AND METHOD FOR MAKING SAME. Patent dated Sept. 14, 1993. Disclaimer filed May 28, 1997, by the assignee, Lucent Technologies, Inc.

Hereby enters this disclaimer to claims 1, 2, 4, 5, 6, 7, 9, 10 and 11 of said patent.
*(Official Gazette,* August 26, 1997)